(No Model.) 2 Sheets—Sheet 2.

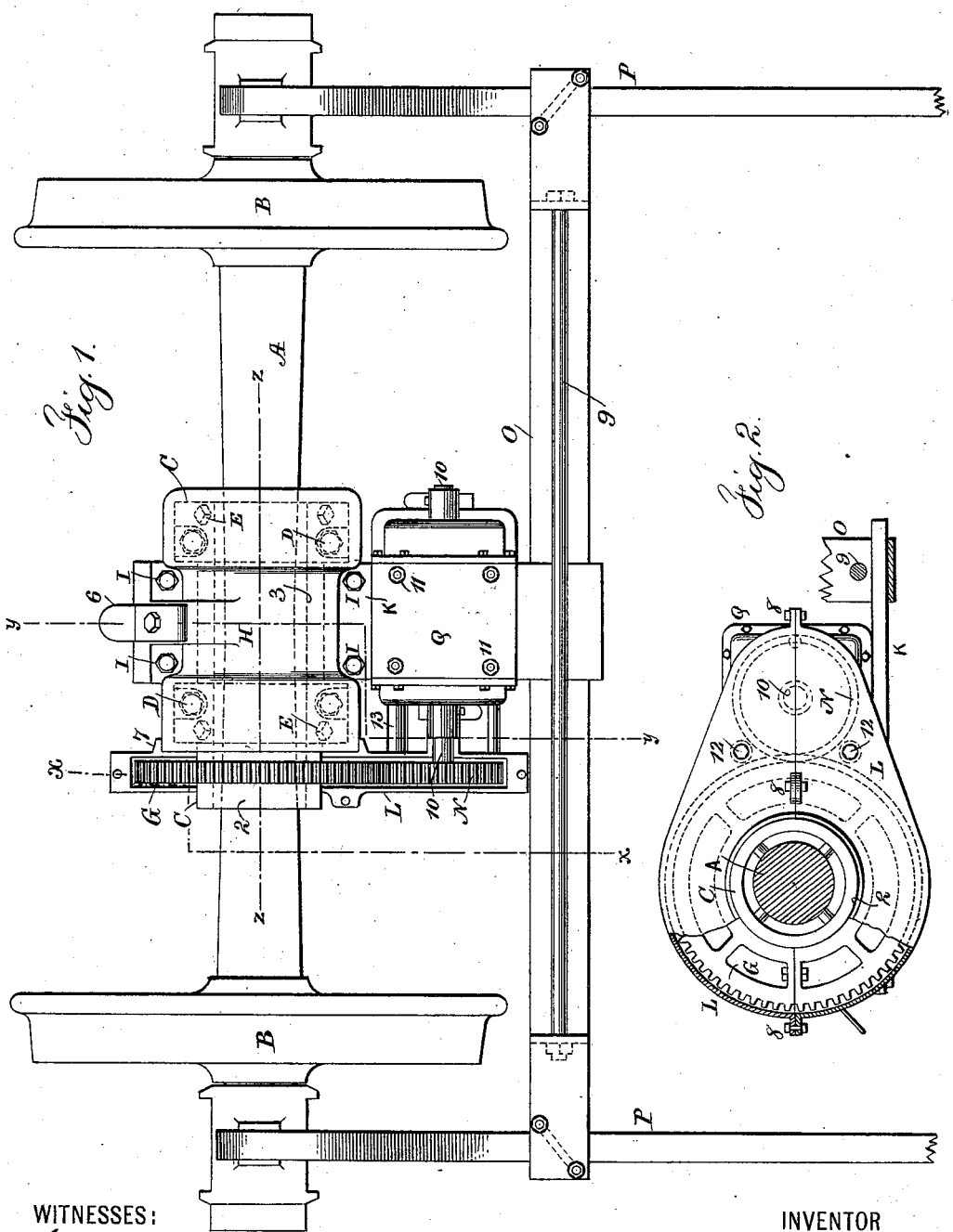

W. BIDDLE.
MEANS FOR MOUNTING DYNAMOS ON RAILWAY CARS.

No. 534,092. Patented Feb. 12, 1895.

WITNESSES:
Frank S. Ober
Chas. H. Smith

INVENTOR
William Biddle
BY
Lemuel W. Serrell
ATTORNEY

THE NORRIS PETERS CO., PHOTO-LITHO., WASHINGTON, D. C.

UNITED STATES PATENT OFFICE.

WILLIAM BIDDLE, OF BROOKLYN, ASSIGNOR TO THE AMERICAN RAILWAY ELECTRIC LIGHT COMPANY, OF NEW YORK, N. Y.

MEANS FOR MOUNTING DYNAMOS ON RAILWAY-CARS.

SPECIFICATION forming part of Letters Patent No. 534,092, dated February 12, 1895.

Application filed May 23, 1894. Serial No. 512,169. (No model.)

*To all whom it may concern:*

Be it known that I, WILLIAM BIDDLE, a citizen of the United States, residing at Brooklyn, in the county of Kings and State of New York, have invented an Improvement in Dynamos for Railway-Car Lighting, of which the following is a specification.

The object of the present invention is to provide for supporting the dynamo with facility and for adjusting the dynamo so that the gears connecting the armature and the axle of the car wheels may properly engage each other, and also for connecting with the axle a two-part sleeve forming the journal that revolves within the box to which the dynamo is connected, and I provide for permanently fastening the sleeve upon the axle without injury to the axle itself by any holes or recesses for the bolts by which the sleeve is clamped in place.

Figure 3:
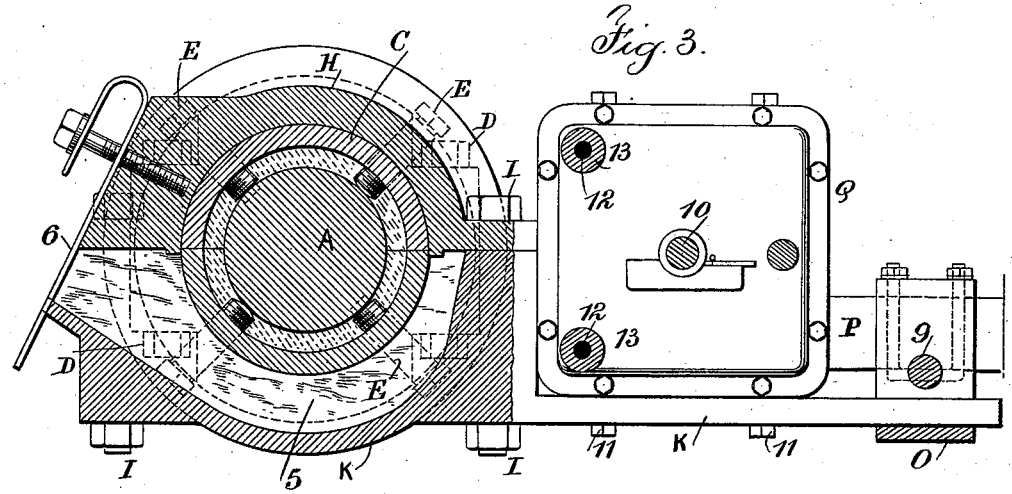
Figure 4:
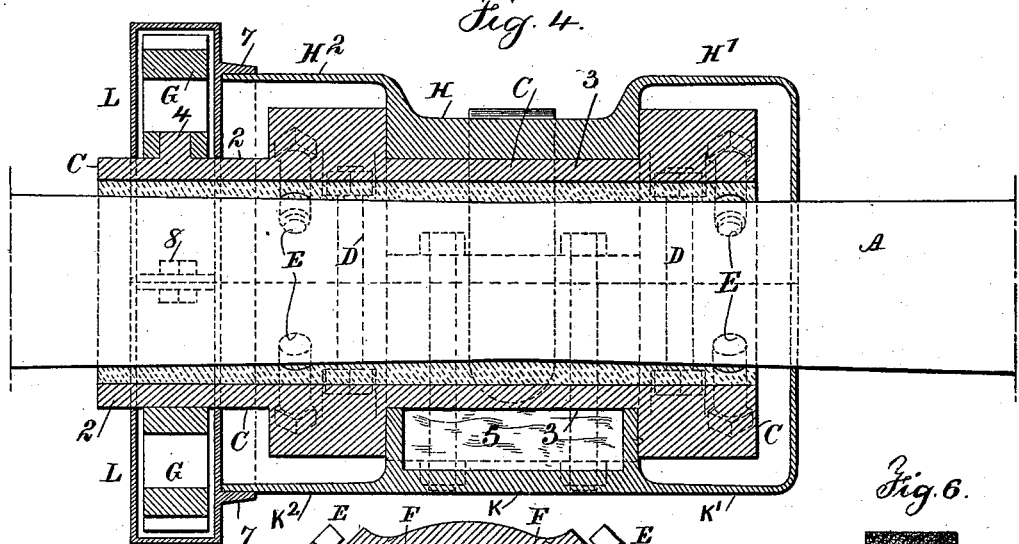
Figure 6:
Figure 5:
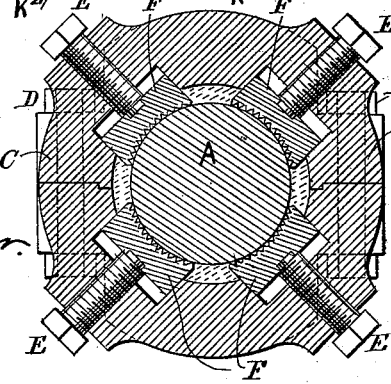

In the drawings, Figure 1 is a plan view. Fig. 2 is a sectional elevation at the line $x$, $x$, Fig. 1 of the box inclosing the gearing. Fig. 3 is a cross section of the axle and of the axle box at the line $y$, $y$, Fig. 1. Fig. 4 is an elevation of the axle and longitudinal section of the axle box at the line $z$, $z$, Fig. 1. Fig. 5 is a cross section representing the manner in which the clamping devices are applied for connecting the sleeve to the axle. Fig. 6 shows the file shaped surface of the vise blocks.

The axle A for the car wheels B is of ordinary construction, and around the same is a two-part sleeve forming the journal of the axle which revolves in the box that supports the dynamo. This two-part sleeve is provided with bolts D by which the two parts are bolted rigidly together and the sleeve is sufficiently large to allow for a space between the interior of the sleeve and the exterior of the axle to be filled in with Babbitt metal, sulphur or other similar material for reliably connecting the two-part sleeve with the axle, and the clamp screws E pass through the bosses or projections of the sleeve radially to the axle, and where sulphur is introduced between the sleeve and the axle after the clamp screws E have been set up so that the exterior surfaces of the sleeve C are concentric to the axis of rotation, plain clamp screws, as shown in Fig. 3, will usually be sufficient, but I prefer and employ the vise-blocks F having segmental surfaces corresponding to the exterior surfaces of the axle and having teeth or serrations, such vise-blocks being of steel, so that the serrations will embed themselves slightly into the surfaces of the axle and prevent slipping, and such vise-blocks are within recesses in the hubs or bosses of the two-part sleeve, and the screws E act upon such vise-blocks, as represented in Fig. 5, and these may be used when the space between the axle and the interior of the two-part sleeve is filled with a composition or with sulphur or similar material.

The portions 2 and 3 of the sleeves C are cylindrical, the portion 2 being adapted to receive around it the two-part gear wheel G, and there is a pin 4 preferably projecting from the cylindrical portion 2 of the divided sleeve entering a hole in the hub of the gear G to prevent such gear working loose or slipping around the sleeve, and the cylindrical portion 3 of the two-part sleeve forms a journal for the box H that is connected by the screws I to the dynamo frame K, and in this frame K and beneath the box H there is an oil space or cavity 5 for the reception of any suitable lubricant for the journal 3, and a movable cap 6 is preferably employed for closing the end of the oil box 5.

It will be observed that the box H sets closely upon the two-part sleeve C at the journal portion 3, so that the axle is free to rotate within the box H, being lubricated from the oil receptacle 5, and the box H is provided with dust caps H' and H² coinciding with and meeting at the edges of the dust caps K' and K² upon the dynamo frame K, so that the ends of the journal are protected from dust by the caps which inclose the bosses or projections of the two-part sleeve where the screws and bolts are applied, and the respective caps H' and K' are made to come up close around the axle A, and the caps H² and K² are cylindrical and set within the annular flange 7 of the box L that incloses the gear G and the gear N or pinion on the armature shaft.

The box L is made in two parts divided horizontally or nearly so and provided with flanges and screws at 8 to connect the two halves together as they are applied from opposite sides around the gears G and N. By this construction dust is excluded from the gears and also from the journal and the bearing or box H.

The dynamo frame K extends out from the oil box in the form of a plate for receiving upon it the dynamo, and this frame K rests upon a bearer O that receives its support from any suitable source such as the equalizing levers P of a car truck, and the rod 9 above the dynamo frame K prevents such frame rising, but the frame is free to slide horizontally upon the bearer O in any direction according to the movement or working of the parts of the truck.

The dynamo itself is to be of any desired character. I have represented the armature shaft 10 as receiving upon it the pinion N, and the case Q surrounds the dynamo, and the parts thereof are bolted together so as to give access to the parts of the dynamo, and this case Q rests upon and is bolted to the dynamo frame K by the bolts 11, and usually the case Q sets up closely into the angle made in the dynamo frame adjacent to the oil-box 5; and it will be now observed that by simply removing the bolts 11 the dynamo can be disconnected from the car after separating the parts of the box L, which is a convenience, because a limited time only is available for taking off one dynamo and putting on another upon a railway car in case of accident to the dynamo.

It will be apparent that the dynamo can be set so as to bring the teeth of the gear G and pinion N properly together, and then the dynamo bolted fast by the bolts 11, the holes through which such bolts 11 pass being slightly elongated to allow for the adjustment in setting the gear teeth.

The bolts 12 passing through the two parts of the case L and into the hubs or bosses 13 upon the dynamo case Q, connect the said case and the box L rigidly, so that the case aids in holding the parts in their proper relation after they have been adjusted and also incloses the gears G and N.

I claim as my invention—

1. The combination with the car axle, of a sleeve permanently secured around the car axle and having a cylindrical portion forming a journal, a dynamo and dynamo frame having an oil-box beneath the journal, a cap or box over the journal and screws for connecting the same to the dynamo frame, a dynamo bolted to the frame, and gearing for connecting the axle and the armature shaft of the dynamo, substantially as set forth.

2. The combination with the axle and dynamo, of a frame passing beneath the dynamo and to which the dynamo is bolted, a box bolted to the dynamo frame and extending over the journal of the axle, there being an oil-box below the journal, a bearer upon which the dynamo frame rests, and dust-caps extending out from the dynamo frame and box respectively and at both ends of the journal, substantially as set forth.

3. The combination with the axle and dynamo, of a frame passing beneath the dynamo and to which the dynamo is bolted, a box bolted to the dynamo frame and extending over the journal of the axle, there being an oil-box below the journal, a bearer upon which the dynamo frame rests, dust-caps extending out from the dynamo frame and box respectively and at both ends of the journal, gearing for connecting the axle and the armature shaft, and a box for inclosing such gearing having at one side an annular flange for receiving the edges of one of the dust-caps, substantially as set forth.

Signed by me this 21st day of May, 1894.

WILLIAM BIDDLE.

Witnesses:
A. M. OLIVER,
GEO. T. PINCKNEY.